United States Patent [19]

Browning

[11] Patent Number: 4,998,507

[45] Date of Patent: Mar. 12, 1991

[54] TANGLE FREE LEASH APPARATUS

[76] Inventor: Joseph B. Browning, Rte. 2, Box 2367, Bandon, Oreg. 97411

[21] Appl. No.: 477,090

[22] Filed: Feb. 8, 1990

[51] Int. Cl.$^5$ ............................................. A01K 27/00
[52] U.S. Cl. .................................... 119/109; 119/106
[58] Field of Search ............... 119/106, 109, 118, 121, 119/122; 273/84 R, 84 A

[56] References Cited

U.S. PATENT DOCUMENTS

| | | | |
|---|---|---|---|
| 354,394 | 12/1886 | Collie | 119/118 |
| 2,798,458 | 7/1957 | Odermatt | 119/106 |
| 4,132,408 | 1/1979 | Sabat | 273/84 A |
| 4,682,774 | 7/1987 | Holy | 273/84 R |

FOREIGN PATENT DOCUMENTS 503652  7/1930  Fed. Rep. of Germany ...... 119/109

Primary Examiner—Robert P. Swiatek
Attorney, Agent, or Firm—Henderson & Sturm

[57] ABSTRACT

A tangle free leash apparatus (10) for controlling animals (100) wherein the apparatus (10) includes semi-rigid, yet flexible leash segments (14) connected together by link members (20) wherein the leash segments (14) are resiliently deformable to resist the passage of an animal around an obstacle (200) and are also deformable to form a closed loop for restraining the animal relative to a stationary object (200).

5 Claims, 2 Drawing Sheets

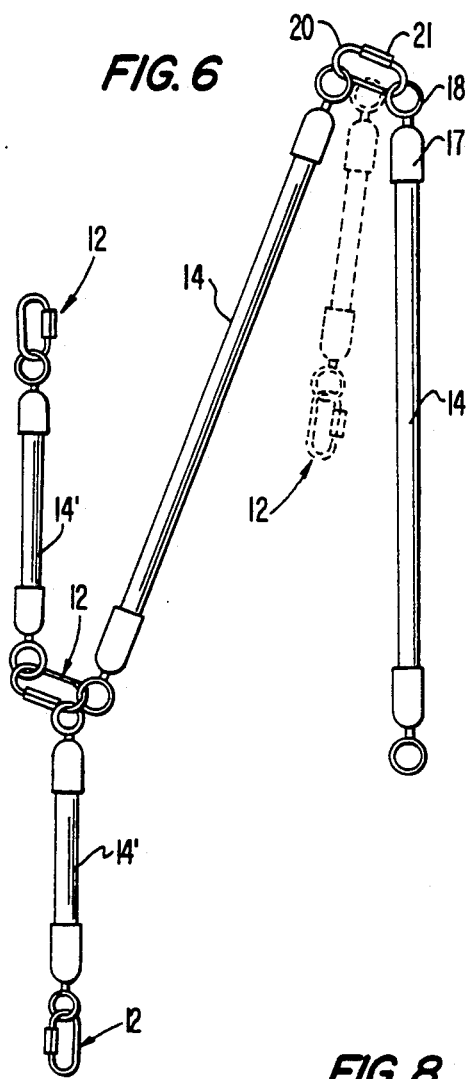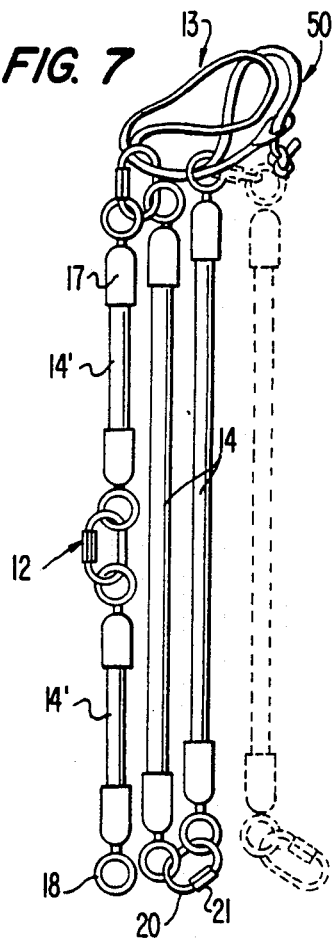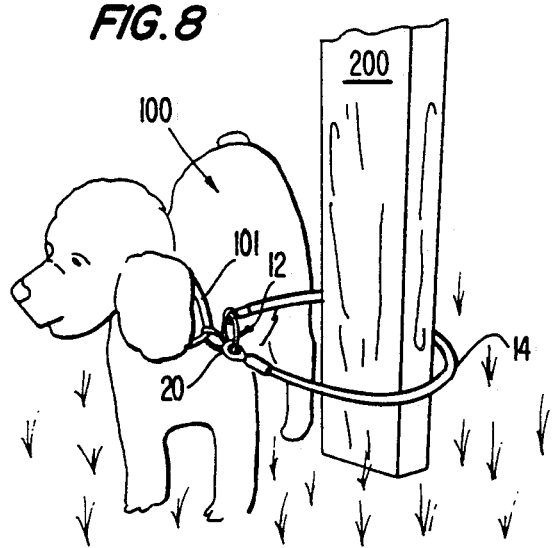

TANGLE FREE LEASH APPARATUS

TECHNICAL FIELD

This invention relates to pet leashes in general, and in particular to a semi-rigid leash apparatus having flexible and semi-rigid components that cooperate with one another to produce a tangle free leash arrangement.

BACKGROUND ART

As can be seen by reference to the following U.S. Pat. No's. 211,408; 548,062; 695,427; 2,833,249; and French Patent No. 437,503 which issued on Feb. 20, 1911; the prior art is replete with myriad and diverse articulated leash constructions for tethering and controlling a variety of animals.

While all of the aforementioned prior art constructions are more than adequate for the basic purpose and function for which they have been specifically designed, these devices are also remiss in a number of different areas in that they all incorporate relatively rigid leash elements intermediate the leash linkage.

As a result of this particular combination of structural components, the prior art devices have totally overlooked the expanded capabilities and characteristics that can be achieved by substituting a semi-rigid, yet flexible leash section in place of the relatively rigid components which they employ.

To begin with, the relatively rigid leash component of the prior art constructions severely limit the adaptability of the overall leash constructions for a variety of useful purposes. Among those limitations is included a loss of movement sensitivity between the animal and the owner which occurs at the linkage portion of the leash.

Furthermore, the prior art constructions are not particularly well suited for the detachment and rearrangement of the leash components to produce a variety of leash configurations.

In addition, the prior art leash constructions do not readily lend themselves to the formation of a restraining loop that will encircle a stationary object for restraining the movement of the animal by using as little as one intermediate semi-rigid leash segment and one connecting linkage.

As a consequence of the foregoing situation, there has existed a longstanding need for a new leash construction which employs semi-rigid yet flexible leash segments intermediate linkage components to produce a versatile and adjustable length and configuration leash arrangement and the provision of such a construction is a stated objective of the present invention.

DISCLOSURE OF THE INVENTION

Briefly stated, the tangle free leash construction that forms the basis of the present invention comprises in general: a plurality of semi-rigid yet flexible leash segments which are connected together by conventional linkage means and a flexible wrist strap which functions both as an auxiliary leash handle and/or a means of retaining all of the components of the leash assembly together during storage or shipping. In addition, auxiliary leash segments are provided to couple two animals to the leash arrangement in either a side-by-side or staggered relationship relative to one another.

As will be better appreciated further on in the specification, the use of flexible yet rigid leash segments produces a number of very useful leash configurations which each serve a distinct purpose.

Furthermore, by using a material which has a resilient memory, such as plastic, for each of the leash segments allows the overall leash configuration to be temporarily deformed by either the owner or the animal, as will be explained shortly.

In addition, by choosing certain plastic materials having particular characteristics regarding their modulus of elasticity, as well as dimensioning, both the length and thickness of each of the main leash segments, it is possible to create individual leash segments that are capable of being deformed into a 360° arc.

An example of the benefits derived from such an arrangement involves the fact that when an animal starts to go around an obstacle such as a tree, pole, or similar object, which is in a direction that the owner does not want the animal to travel in, it is a simple matter to prevent the animal from circling the object by the owner remaining stationary as the animal pursues their deviant course. Once one or more of the leash segments contact the periphery of the object, the segments will tend to resist deformation, thereby setting up a resistance force to the animal's intended direction of travel, and this resistance force will gradually increase as the animal continues to deviate from the relaxed ax alignment of the individual segment.

Other examples of benefits derived from this arrangement involve the fact that the leash apparatus may be used to tether an animal to stationary objects without limiting the animal's ability to freely circle the stationary object, such as to find shade, or the like. Furthermore, depending on the circumference of the stationary object it may be possible to employ only a single main leash segment to accomplish the tethering function, while larger circumference stationary objects will obviously require a plurality of leash segments and their associated linkages.

Another advantage to this particular arrangement is that the linkages employ oversized coupling links which are dimensioned to receive the user's fingers, such that each of the linkages functions as a quasi-leash handle for controlling the animal in close proximity to the owner.

It should also be noted that when the linkage on the inboard end of the first leash segment is grasped by the owner to closely control the animal, the remaining leash segments can be used to ward off other unfriendly creatures that might pose a threat to the pet and/or owner.

Furthermore, the owner can use the outboard leash segments to encircle their own torsos so as to provide a hands free control over the animal.

Still another advantage of this leash arrangement is the fact that more than one animal can be attached to the leash construction and this may be accomplished in either a staggered or side by side relationship depending upon the placement of auxiliary leash segments relative to the main leash segments.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 6 is a detail view of another variation of the leash configuration;

FIG. 7 is a detail view of the storage configuration of the leash; and

FIG. 8 is a perspective view of one of the restraint configurations using a single leash segment.

BEST MODE FOR CARRYING OUT THE INVENTION

Figure 1:
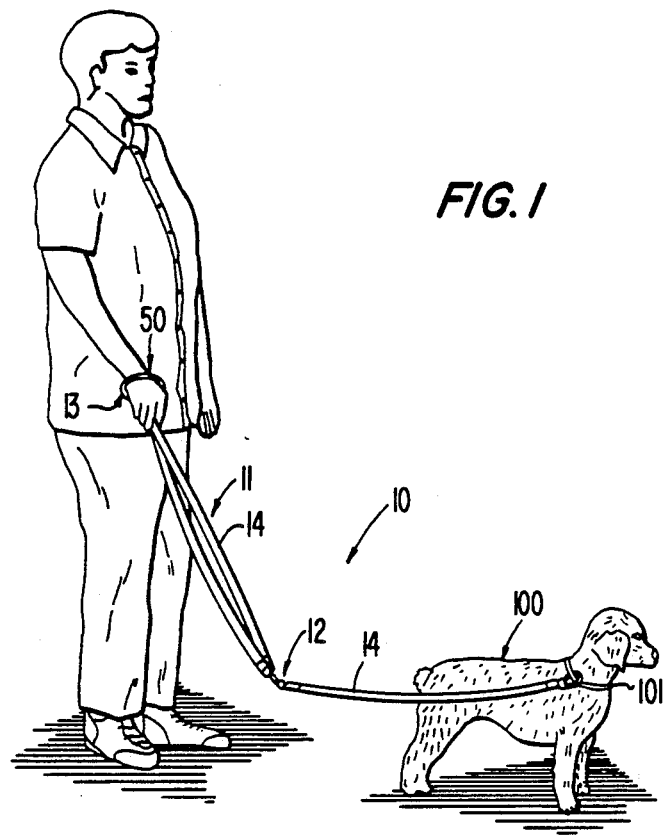
FIG. 1 is a perspective view depicting one of the possible leash configurations of this invention.

Referring now to the drawings, wherein like reference numerals designate identical or corresponding parts throughout the several views, FIG. 1 depicts the tangle free leash apparatus that forms the basis of the present invention, designated generally by the reference numeral (10). The apparatus (10) comprises in general: a plurality of main leash units (11) connected together by linkage units (12) and having a primary handle unit (13) disposed on one end. These units will now be described in seriatim fashion.

Figure 2:
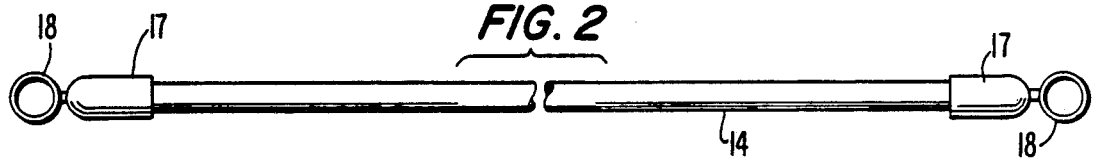
FIG. 2 is a top plan view of the semi-rigid leash segment.
Figure 3:
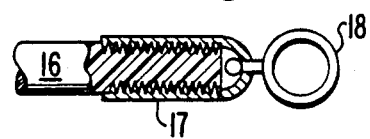
FIG. 3 is a detailed cross-sectional view of one form of the leash segment end cap construction.
Figure 4:
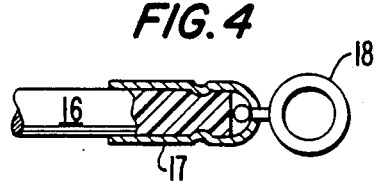
FIG. 4 is a detailed cross-sectional view of another form of the leash segment end cap construction.

As shown in FIGS. 2 through 4, the main leash unit (11) comprises elongated leash segments (14) in the form of elongated rods (15) of a semi-rigid yet flexible plastic material (16) such as DELRIN which is manufactured by DuPont Corporation, or ACETAL which is manufactured by Celanese Corporation. These particular materials are extremely lightweight, durable, and resiliently deformable over a relatively short length into a 360° circle, and in the preferred embodiment, the elongated rods (15) have an average diameter of approximately 1/4 inch.

Still referring to FIGS. 2 through 4, it can be seen that each of the rods (15) is provided with end cap members (17) having a ring element (18) rotatably disposed on and projecting outwardly from each of the cap members (17). In one version of the preferred embodiment depicted in FIG. 3, the end cap members (17) are threadably engaged with the rods (15) and in the other version of the preferred embodiment illustrated in FIG. 4, the end cap members (17) are crimped to the ends of the rods (15).

Turning now to FIGS. 6 and 7, it can be appreciated that the linkage units (12) comprise enlarged conventional connecting link members (20) having a slip collar (21) which controls the standard opening (not shown) in the connecting link members (20) to operatively engage the elongated main leash segments (14) to one another in a well recognized fashion.

Figure 5:
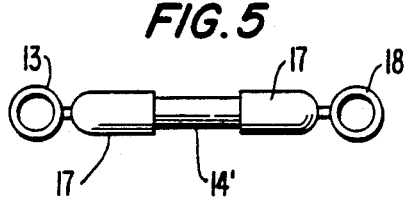
FIG. 5 is a top plan view of a separator segment.

As can be seen particularly be reference to FIGS. 5 and 6, this invention also contemplates the use of auxiliary leash segments (14') which are substantially shorter in length than the elongated main leash segments (14) wherein with the exception of the length differential the auxiliary (14') and main (14) leash segments are otherwise virtually identical.

These auxiliary segments (14') are operatively attached to the main leash segments (14) by the connecting link members (20) either in tandem as depicted in solid lines in FIG. 6, or with one of the auxiliary leash segments (14') depicted in phantom disposed on the opposite end of the main leash segment (14) for the purpose of keeping two animals separated.

Turning now to FIGS. 1 and 7, it can be seen that the primary handle unit (13) comprises a closed loop flexible handle member (50) which is intended to be slipped through either the ring element (18) or the connecting link (20) on one end of a primary leash segment furthest from the animal (100).

As shown in FIG. 8, one arrangement of the leash apparatus (10) contemplates using a single primary leash segment (14) and a single connecting link (20) to restrain an animal (100) wearing a collar (101) to a stationary object (200) such as a post or pole. In this arrangement, the single leash segment (14) is deformed into a loop whose ends are joined by the connecting link (20) passing through the ring elements (18) on opposite ends of the leash segment (14) wherein the connecting link (20) also captively engages a portion of the animal's collar (101).

As mentioned previously in the specification, the connecting link (20) is enlarged to accept the user's fingers so that each of the connecting links (20) functions as an auxiliary handle. Furthermore, the primary handle unit (13) as shown in FIG. 7 can be used to suspend all of the other components of the leash apparatus (10) in a storage configuration.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A tangle free leash apparatus for controlling animals wherein the leash apparatus comprises:
    at least one elongated one-piece solid cylindrical leash segment fabricated from semi-rigid, yet flexible plastic material; having an elastic memory whereby the at least one leash segment may be resiliently deformed into a loop configuration which will then return to a straight configuration when relaxed; and, wherein the at least one leash segment comprises an elongated rod having its opposite ends provided with end cap members wherein each end cap member has a ring element rotatably disposed thereon; and
    a linkage unit comprising an enlarged connecting link member adapted to join the ring elements on said at least one elongated leash segment.

2. The apparatus as in claim 1 further including:
    a primary handle unit including a closed loop flexible handle member adapted to engage both the linkage unit and at least one of the said ring elements.

3. A tangle free leash apparatus for controlling animals, wherein the leash apparatus comprises:
    a plurality of main leash units wherein each main leash unit comprises an elongated one-piece solid cylindrical resilient leash segment fabricated from semi-rigid, yet flexible plastic material having an elastic memory which will return the leash segment to a straight configuration when relaxed in the form of an elongated rod having end cap members formed on its opposite ends wherein each end cap member is provided with a rotatable ring element; and,
    a plurality of linkage units each comprising an enlarged link connecting member adapted to operatively engage the ring elements on the main leash segments to join the plurality of main leash units together.

4. The apparatus as in claim 3 further comprising:

a primary handle unit including a closed loop flexible handle member.

5. The apparatus as in claim 4 further comprising:
auxiliary leash segments which are substantially shorter in length than said elongated leash segments wherein said auxiliary leash segments are adapted to be operatively connected to said elongated leash segments via the connecting link members.

* * * * *